(12) United States Patent
Limoges et al.

(10) Patent No.: US 6,976,107 B2
(45) Date of Patent: Dec. 13, 2005

(54) ADAPTIVE SPIN LATCHES

(75) Inventors: Joseph Serge Limoges, Etobicoke (CA); Dominique J. Evans, North York (CA); Dale J. Hagen, Toronto (CA); Matthew A. Huras, Ajax (CA); Stephen A. Schormann, Ajax (CA); Mark F. Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/242,524

(22) Filed: Sep. 12, 2002

(65) Prior Publication Data
US 2003/0196015 A1 Oct. 16, 2003

(30) Foreign Application Priority Data
Apr. 15, 2002 (CA) .................................. 2,381,739

(51) Int. Cl.[7] .............................................. G06F 13/22
(52) U.S. Cl. ...................................... 710/220; 710/200
(58) Field of Search ......................... 707/8, 9, 10, 200; 718/102, 104

(56) References Cited
U.S. PATENT DOCUMENTS
5,301,330 A 4/1994 Tran
5,444,705 A 8/1995 Olnowich et al.
6,134,653 A 10/2000 Roy et al.
6,578,033 B1 * 6/2003 Singhal et al. ................ 707/8
2002/0078119 A1 * 6/2002 Brenner et al. ............. 709/102

OTHER PUBLICATIONS
Lee S-Y, Liou R-L, "A multi-granularity locking model for concurrency control in object-oriented database systems," IEEE Transactions on Knowledge and Data Engineering, 8: Feb. 1, 1996, pp. 144-156.*

* cited by examiner

Primary Examiner—Tim Vo
Assistant Examiner—Clifford Knoll
(74) Attorney, Agent, or Firm—Marilyn Smith Dawkins

(57) ABSTRACT

An adaptive spin latch system is provided for use in a multiprocessor computer system. The spin latch system includes a run queue, a spin latch module and a wait queue. The run queue is adapted to store agent index data correlated to at least one agent in run mode. The spin latch module is adapted to put the at least one agent into sleep mode for a period of time correlated to a number of agents awaiting access to a resource. The wait queue is adapted to store agent index data correlated to the at least one agent in sleep mode. A method of regulating access by agents to a resource in a multiprocessor computing system is also provided.

13 Claims, 4 Drawing Sheets

ADAPTIVE SPIN LATCHES

FIELD OF THE INVENTION

This invention relates to the field of multiprocessor computing systems, and in particular to adaptive spin latches for regulating access to resources.

BACKGROUND

In multiprocessor environments, such as ATM (automated teller machine) networks and other large-scale database systems, multiple processes or threads (in larger systems, numbering in the thousands) share processor time.

Typically, at its execution stage a process will be allotted a time slice or "quantum" of processing time on a processor. If the process is not completed within the quantum of time, context information reflecting the level of completion of the process will be stored, and the process will be put to the end of a queue (the "Run Queue") of processes awaiting access to a processor. This "context switch" itself consumes processing time, as data corresponding to the process being executed (including the context word, as will be understood) must be moved from the processor registers to main memory, typically RAM (random access memory), and another process must be moved from main memory to the process registers for subsequent execution by the processor.

In executing a process, a processor may require access to certain resources including I/O (input/output) devices and segments of memory. In the multiprocessor context, conflicts between executing processes may arise if multiple processes require access to the same exclusive resource at the same time. Different techniques have been developed to address these types of process conflicts.

As a result of the processing expense of context switching, instead of simply generating a context switch if a process requires access to a resource which is already in use, one technique for resolving process conflicts involves the use of spin latches. Spin latches cause a processor to "spin" or loop in accordance with predetermined spin counter values, while the processor periodically checks to determine if the desired resource has become available.

In some instances, particularly in large-scale database systems, the computing system's processing efficiency may drop significantly if the number of processes competing for a particular resource is sufficiently large, as volumes of these processes unsuccessfully use processing time in running spin latches.

Accordingly, a solution that addresses, at least in part, these and other short comings is desired.

SUMMARY

An aspect of the present invention provides an adaptive spin latch system for use in a multiprocessor computer system. The spin latch system includes a run queue, a spin latch module and a wait queue. The run queue is adapted to store agent index data correlated to at least one agent in execution mode. The spin latch module is adapted to put the at least one agent into sleep mode for a period of time correlated to a number of agents awaiting access to a resource. The wait queue is adapted to store agent index data correlated to the at least one agent in sleep mode, wherein said agent in sleep mode is awaiting access to a resource.

Another aspect of the present invention provides a method of regulating access to a resource in a multiprocessor computing system. The method includes providing at least one agent that is capable of being set in at least a run mode and a sleep mode, and determining the number of agents in sleep mode awaiting access to the resource.

BRIEF DESCRIPTION OF THE DRAWINGS

Embodiments of the present invention will now be described, by way of example only, with reference to the following drawings, in which like reference numerals refer to like parts and in which.

DETAILED DESCRIPTION

Figure 1:
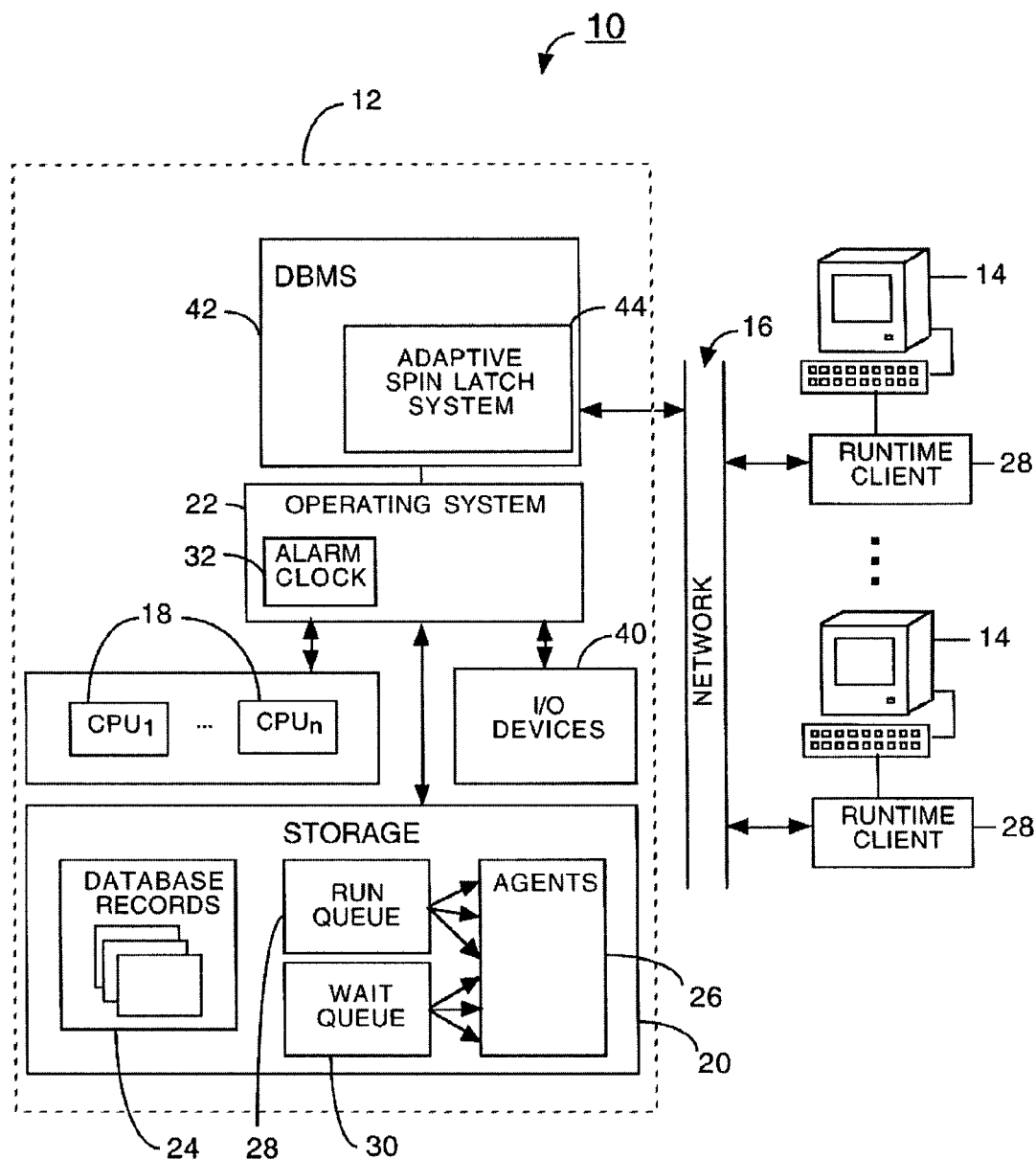
FIG. 1 shows a schematic diagram of a multiprocessor computing system comprising an adaptive spin latch system.

Referring to FIG. 1, illustrated therein is a multiprocessor computing system, referred to generally as 10. The computing system 10 comprises a multiprocessor computer 12 which is linked to various (typically remote) terminals 14 via a network 16. For example, the computing system 10 may form part of a banking system, with various ATMs (automated teller machines) as remote terminals 14. Also, for example, the computing system 10 may form part of a centralized database system with terminals 14 capable of accessing the data stored in the computer system 10.

The multiprocessor computer 12 includes software, hardware and firmware components, including a bank of central processor units (CPUs) 18, memory storage 20 (including RAM, ROM and long term storage), and operating system software 22 (typically stored in ROM) controlling the interaction of the various components of the computer 12. The memory storage 20 preferably stores data relating to database records 24, executable processes (also known as agents or dispatchable threads) 26, and a run queue 28 which contains links indexing to each process in the executable processes data 26 which is in run mode and ready to be executed. The storage 20 also includes a wait queue 30 which contains links indexing to each process in the executable processes data 26 which has been set to sleep mode.

The operating system 22 includes an "alarm clock" module 32 which stores data correlated to each process set to sleep mode in the executable processes data 26, as well as data correlated to the time at which each such process is to "wake up". The module 32 is configured to keep track of each process in sleep mode, as well as the scheduled "wake up" time. When the operating system 22 changes the status of a process from run to sleep, the link to the process in the run queue 28 is removed and a link to the process is added to the wait queue 30. At the time set for the process to "wake up", the operating system 22 removes the correlated link from the wait queue 30 and adds a link to the process to the run queue 28.

The computer 12 may also include I/O device components 40, such as printers and monitors. The computer 12 is also suitably programmed with a database management system (DBMS) 42 operatively coupled to the operating system 22, and includes an adaptive spin latch system referred to generally as 44 configured to adaptively regulate processes competing for access to a resource, as will be explained in greater detail below.

Each terminal 14 generally includes a processor (including RAM and ROM) which is suitably programmed with a runtime client application program interface 28 adapted to communicate with the DBMS 42.

Figure 2:
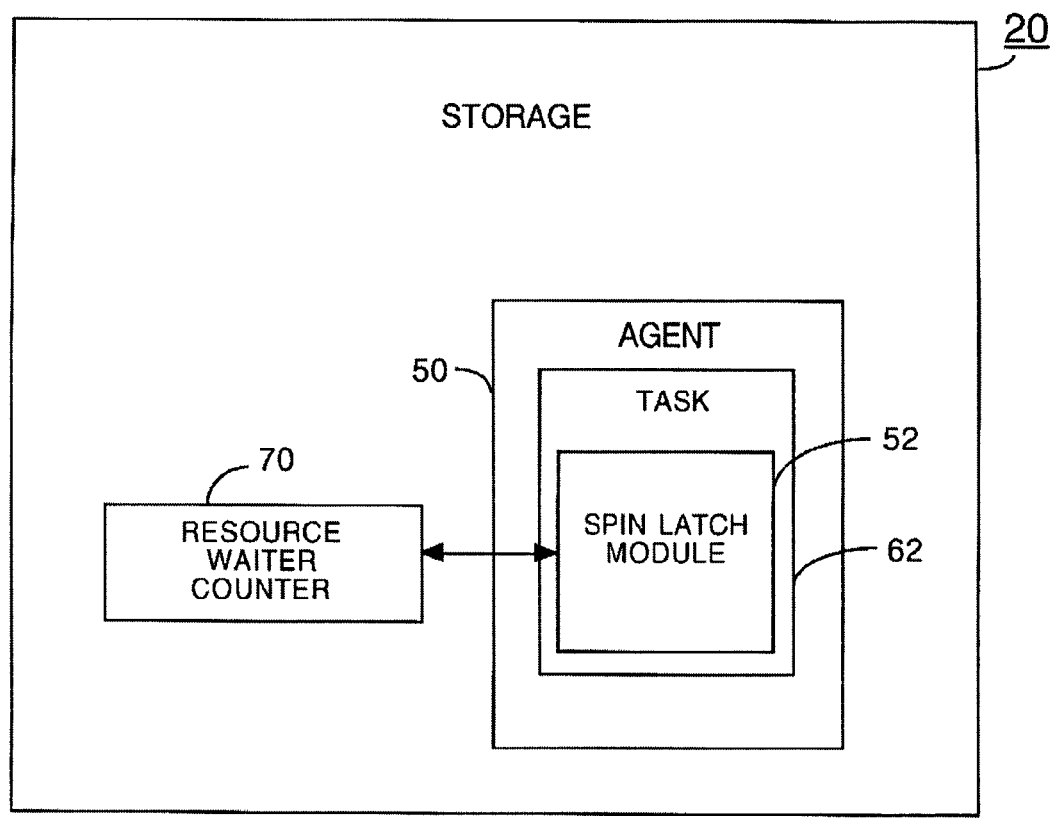
FIG. 2 shows a schematic diagram of an agent for use in the adaptive spin latch system of FIG. 1.

Referring now to FIG. 2, illustrated therein is storage 20 containing an agent 50. In large systems 10, it is not uncommon for thousands of agents 50 (each of which is assigned a unique process identifier) to be active at any instance of time. Each agent 50, with its spin latch module 52, as well as the run 28 and wait 30 queues form part of the adaptive spin latch system 44.

Agents 50 also contain software 62 (which may vary from one agent 60 to the next) programmed to accomplish a particular task. This software 62 preferably contains software code in the form of a spin latch module 52 described in greater detail below. The agent 50 also typically stores context word data corresponding to register values and other data, which is used to initialize the registers (not depicted) if the child agent commences execution on a CPU 18, and which is updated after each context switch following processing by a CPU 18. As an agent 50 is created, a link to the agent 50 using its unique process identifier is stored on the run queue 28, and the agent 50 awaits access to a CPU 18 for processing.

As noted previously, when an agent 50 is executing on a CPU 18 it may request access (via the operating system 22) to an exclusive resource (e.g. database records 24 in storage 20). Typically, an agent 50 attempts to "lock" the resource (that is, prevent other agents from accessing the locked resource). In the event that the resource is already being used by another agent 50, the lock attempt fails. In order to prevent a context switch, the use of spin latches is introduced. Spin latches cause the CPU 18 to "spin" or loop in accordance with predetermined spin counter values, while periodically checking to determine if a desired resource has become available.

Ultimately, if the agent 50 is unable to lock and access the resource, the agent 50 is put into sleep mode (with its pointer being removed from the run queue 28 and a pointer being stored in the wait queue 30) for a period of time.

The storage 20 also includes resource waiter counter 70 which stores data correlated to the number of agents 50 awaiting access to a particular exclusive resource (e.g. database records 24 in storage 20).

Figure 3:
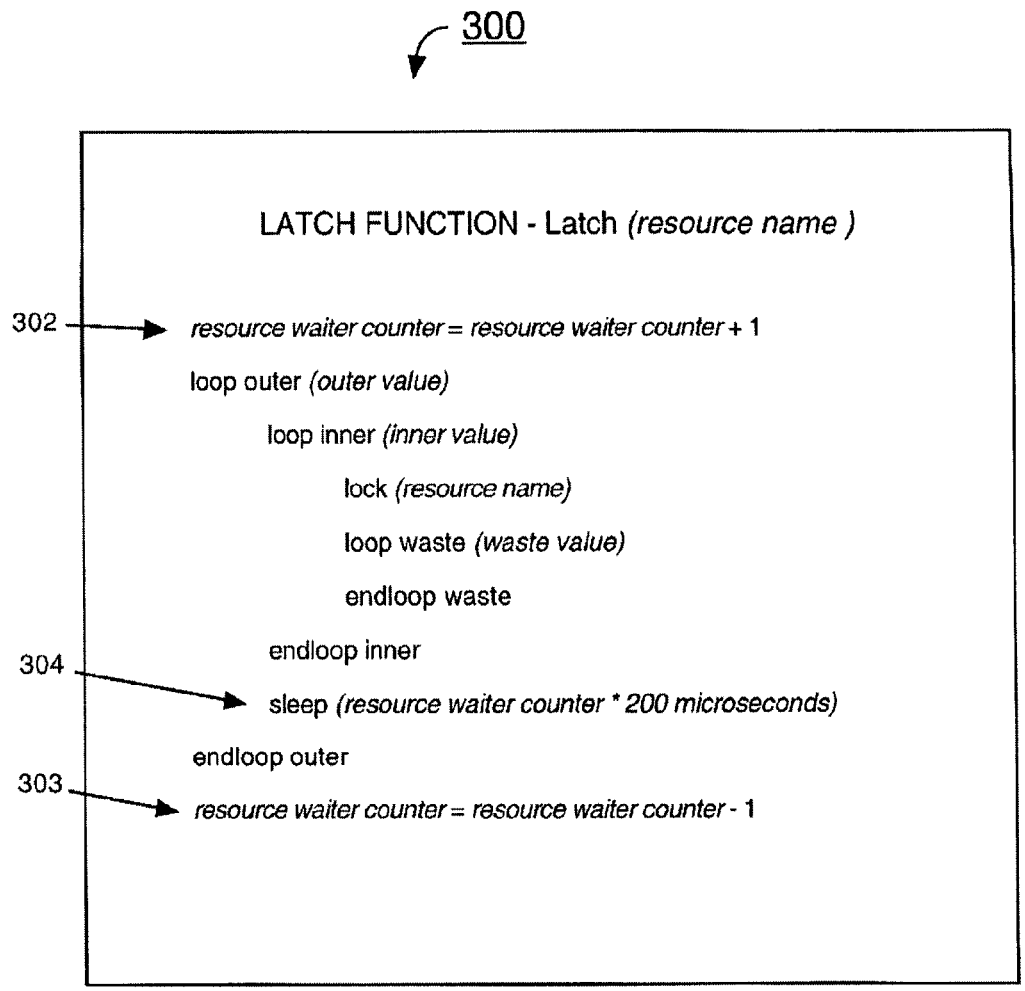
FIG. 3 shows pseudo-code of an adaptive spin latch function for use in the adaptive spin latch system of FIG. 1.

FIG. 3 shows pseudo-code referred to generally as 300 for a spin latch module 52 executed by a CPU 18 for an agent 50 during processing. At the start of the function 300 as indicated by 302, the resource waiter counter 70 for the particular exclusive resource requested by the agent 50 (referred to as "resource name") is incremented by 1. While only a single resource waiter counter 70 has been illustrated in FIG. 1, it should be understood that preferably a resource waiter counter exists for each exclusive resource.

Using looping structures, the function 300 then cycles through a predetermined number of attempts to lock the resource. The values (also known as variables) for the outer, inner and waste loops, namely outer value, inner value and waste value, control the number of times the spin latch function 300 loops (and hence the amount of time and number of attempts made by the function 300 to lock and access the resource). If an attempt to lock the resource is successful, the agent 50 is able to access the resource in performance of its task 62, and the resource waiter counter 70 is decremented by 1 as indicated by 303.

If the attempts to lock and access the resource are unsuccessful, at 304 the function 300 puts the agent 50 into sleep mode, thereby initiating a context switch and yielding the CPU 18 to the next agent 50 indexed in the run queue 28. Setting the agent 50 into sleep mode involves the operating system 22 deleting the correlated pointer to the agent 50 from the run queue 28 and storing a corresponding pointer in the wait queue 30. The operating system's 22 alarm clock module 32 also tracks the amount of time that the agent 50 is to be in sleep mode, and hence when the agent 50 is to be "wakened" and set into run mode.

It is important to note, however, that the function 300 does not simply put the agent 50 into sleep mode at 304 for a defined period of time (e.g. 200 microseconds). Instead, the agent 50 is put into sleep mode for a period of time multiplied by the resource waiter counter 70 data (which tracks the number of agents waiting to access the resource). Other equations which correlate the amount of time an agent 50 is put into sleep mode, to the number of agents 50 awaiting access to the resource may also work acceptably.

By correlating the amount of time the agent 50 is put into sleep mode with the number of agents 50 waiting to access the resource, during times of increased activity on the system 10, as the number of agents 50 competing to access the resource increases, the amount of time each unsuccessful agent 50 is put into sleep mode correspondingly increases. Regulating the agents 50 in this manner reduces the likelihood of a large number of agents 50 competing for the same resource, "waking up" at essentially the same time. Since only one agent 50 may access an exclusive resource at a time by definition, having a large number of agents 50 "waking up" out of sleep mode at essentially the same time would result in processing inefficiency and low throughput.

Once the latch function 300 has been completed successfully, as noted, at 303 the resource waiter counter 70 for the particular exclusive resource requested by the agent 50 is decremented by 1, since the agent 50 is no longer waiting for the resource.

Figure 4:
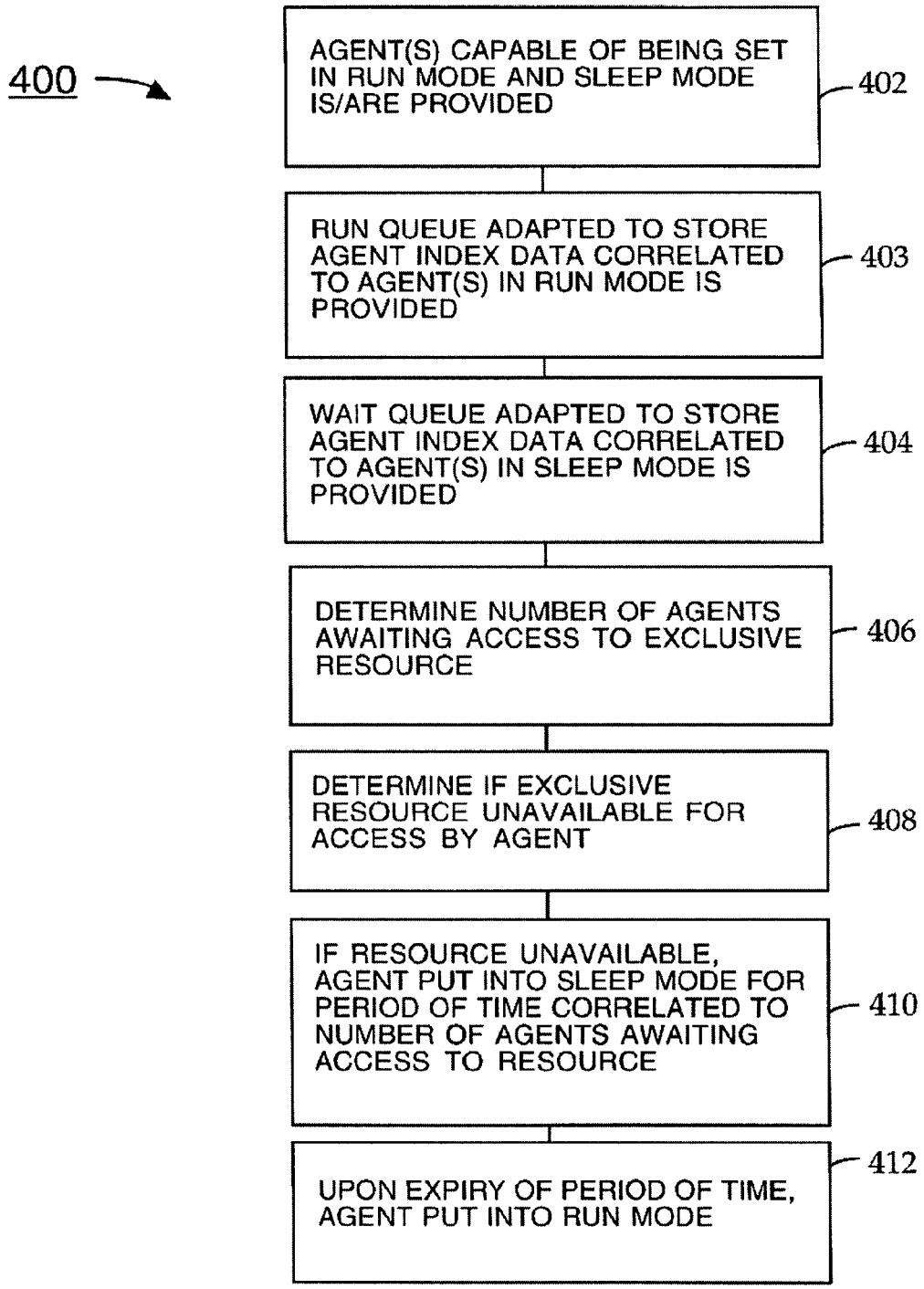
FIG. 4 shows operation of the adaptive spin latch system of FIG. 1.

FIG. 4 illustrates the operations 400 for regulating access by agents 50 to a resource in a multiprocessor computing system 10. At least one agent 50 is provided which is capable of being set in at least a run mode and a sleep mode. (Block 402) A run queue 28 is provided which is adapted to store agent index data correlated to the at least one agent 50 when the agent 50 is in run mode. (Block 403) A wait queue 30 is also provided which is adapted to store agent index data correlated to the at least one agent 50 when the agent 50 is in sleep mode. As noted above, an agent is set in run mode when correlated agent index data is stored in the run queue 28, and is set in sleep mode when correlated agent index data is stored in the wait queue 30. (Block 404).

The number of agents 50 awaiting access to the resource is determined. Typically, as noted above, this may involve providing data storage such as the resource waiter counter 70 which stores data correlated to the number of agents 50 awaiting access to the resource. When an agent 50 attempts to access the resource (such as by commencing a spin latch function 300), the resource waiter counter 70 is incremented. Similarly, once the agent 50 has completed its access to the resource, the resource waiter counter 70 is decremented. (Block 406)

The availability (or lack thereof) of the resource for access by the at least one agent 50 is determined. Typically, this involves the use of a latch function 300 making repeated attempts to lock the resource. (Block 408) In the event the resource is unavailable for access by the at least one agent 50, the agent 50 is put into sleep mode for a period of time correlated to the resource waiter counter 70, i.e. the number of agents awaiting access to the resource (as illustrated at 304 in FIG. 3). As noted above, setting the agent 50 into sleep mode involves the operating system 22 deleting the correlated pointer to the agent 50 from the run queue 28 and storing a corresponding pointer in the wait queue 30. (Block 410) The operating system's 22 alarm clock module 32 also tracks the amount of time that the agent 50 is to be in sleep mode, and hence when the agent 50 is to be "wakened" and set into run mode. At the time set for the process to "wake up", the operating system 22 removes the correlated link from the wait queue 30 and adds a link to the process in the run queue 28. (Block 412)

Thus, while what is shown and described herein constitutes preferred embodiments of the subject invention, it should be understood that various changes can be made without departing from the subject invention, the scope of which is defined in the appended claims.

The embodiments of the invention in which an exclusive property or privilege is claimed are defined as follows.

What is claimed is:

1. An adaptive spin latch system for use in a multiprocessor computer system, the spin latch system comprising:
   a run queue adapted to store agent index data correlated to at least one agent in execution;
   a spin latch module adapted to put the at least one agent into sleep mode for a period of time multiplied by a number of agents awaiting access to a resource whereby as the number of agents awaiting access increases the amount of time each waiting agent is put into sleep mode correspondingly increases; and
   a wait queue adapted to store agent index data correlated to the at least one agent in sleep mode, awaiting access to a resource.

2. The adaptive spin latch system as claimed in claim 1, wherein the spin latch module is adapted to detect if the resource is unavailable for access by the at least one agent in execution mode.

3. The adaptive spin latch system as claimed in claim 2, wherein the spin latch module is operatively coupled to an operating system, and wherein the spin latch module is adapted to cause the deletion of index data in the run queue correlated to the agent in execution mode and cause the storage of index data in the wait queue correlated to the agent.

4. The adaptive spin latch system of claim 1 operatively coupled to a database management system.

5. The adaptive spin latch system as claimed in claim 1, further comprising means for determining the number of agents awaiting access to the resource.

6. The adaptive spin latch system as claimed in claim 2, further comprising a resource waiter counter adapted to store data correlated to the number of agents awaiting access to the resource.

7. A computer program stored on a computer readable medium having executable instructions for directing a computer processing system to implement an adaptive spin latch system, comprising:
   a run queue adapted to store agent index data correlated to at least one agent in execution mode;
   a spin latch module adapted to put the at least one agent into sleep mode for a period of time multiplied by a number of agents awaiting access to a resource whereby as the number of agents awaiting access increases the amount of time each waiting agent is put into sleep mode correspondingly increases; and
   a wait queue adapted to store agent index data correlated to the at least one agent in sleep mode, awaiting access to a resource.

8. A method of regulating access by agents to a resource in a multiprocessor computing system, the method comprising:
   providing at least one agent, wherein the at least one agent is capable of being set in at least a run mode and a sleep mode;
   determining the number of agents awaiting access to the resource;
   determining if the resource is unavailable for access by the at least one agent; and
   upon determining that the resource is unavailable for access by the at least one agent, putting the at least one agent into sleep mode for a period of time multiplied by the number of agents awaiting access to the resource whereby as the number of agents awaiting access increases the amount of time each waiting agent is put into sleep mode correspondingly increases.

9. The method as claimed in claim 8, further comprising providing a run queue adapted to store agent index data correlated to at least one agent in run mode and providing a wait queue adapted to store agent index data correlated to the at least one agent in sleep mode, wherein said agent in sleep mode is awaiting access to a resource.

10. The method as claimed in claim 9, wherein said upon determining comprises storing agent index data correlated to the at least one agent in the wait queue, and deleting agent index data correlated to the at least one agent from the run queue.

11. The method as claimed in claim 10, further comprising providing a resource waiter counter adapted to store data correlated to the number of agents awaiting access to the resource.

12. The method as claimed in claim 11, further comprising:
   determining the expire of the period of time; and
   upon the expire of the period of time, putting the at least one agent into run mode.

13. A computer program product having a computer readable medium having instructions for directing a computer system to perform a method of regulating access by agents to a resource in a multiprocessor computing system, comprising:
   providing at least one agent, wherein the at least one agent is capable of being set in at least a run mode and a sleep mode;
   determining the number of agents awaiting access to the resource;
   determining if the resource is unavailable for access by the at least one agent;
   upon determining that the resource is unavailable for access by the at least one agent, puffing the at least one agent into sleep made for a period of time multiplied by the number of agents awaiting access to the resource whereby as the number of agents awaiting access increases the amount of time each waiting agent is put into sleep mode correspondingly increases; and
   upon the expire of the period of time, putting the at least one agent into run mode.

* * * * *

UNITED STATES PATENT AND TRADEMARK OFFICE
CERTIFICATE OF CORRECTION

PATENT NO. : 6,976,107 B2
DATED : December 13, 2005
INVENTOR(S) : Limoges et al.

It is certified that error appears in the above-identified patent and that said Letters Patent is hereby corrected as shown below:

Column 6,
Lines 38, 39 and 60, delete "expire" and insert -- expiry --;
Line 54, delete "puffing" and insert -- putting --;
Line 55, delete "made" and insert -- mode --.

Signed and Sealed this

Thirteenth Day of June, 2006

JON W. DUDAS
*Director of the United States Patent and Trademark Office*